United States Patent [19]

Bezman et al.

[11] 4,401,556

[45] Aug. 30, 1983

[54] MIDBARREL HYDROCRACKING

[75] Inventors: Richard D. Bezman, White Plains; Jule A. Rabo, Armonk, both of N.Y.

[73] Assignee: Union Carbide Corporation, Danbury, Conn.

[21] Appl. No.: 367,783

[22] Filed: Apr. 12, 1982

Related U.S. Application Data

[63] Continuation of Ser. No. 93,586, Nov. 13, 1979, abandoned.

[51] Int. Cl.³ ............................................ C10G 47/20
[52] U.S. Cl. .................................................... 208/111
[58] Field of Search ..................... 208/111, DIG. 2; 252/411 R

[56] References Cited

U.S. PATENT DOCUMENTS

| | | | |
|---|---|---|---|
| 3,293,192 | 12/1966 | Maher et al. | 252/438 X |
| 3,354,077 | 11/1967 | Hansford | 208/111 |
| 3,449,070 | 6/1969 | McDaniel et al. | 423/328 |
| 3,493,519 | 2/1970 | Kerr et al. | 208/120 X |
| 3,513,108 | 5/1970 | Kerr | 423/328 X |
| 3,687,869 | 8/1972 | Hensley | 208/111 X |
| 3,694,345 | 9/1972 | Bittner | 208/111 |
| 3,699,036 | 10/1972 | Hass et al. | 208/111 |
| 3,781,199 | 12/1973 | Ward | 208/89 |
| 3,783,123 | 1/1974 | Young | 208/111 |
| 3,917,543 | 11/1975 | Bolton et al. | 111 X/ |

Primary Examiner—Delbert E. Gantz
Assistant Examiner—G. E. Schmitkons
Attorney, Agent, or Firm—Gary L. Wamer

[57] ABSTRACT

Certain hydrophobic derivatives of zeolite Y are found to be unusually selective and active catalysts with adequate stability for use in the conversion of high boiling petroleum feedstocks into fuel gases, gasoline and middle distillate products such as diesel and turbine fuel.

2 Claims, No Drawings

MIDBARREL HYDROCRACKING

This application is a continuation of Ser. No. 93,586, Nov. 13, 1979, abandoned.

The present invention relates in general to the catalytic conversion of hydrocarbons, and more particularly to the process for the catalytic hydrocracking of heavy hydrocarbon or petroleum feedstocks to midbarrel products using a catalyst comprising a hydrophobic derivative of zeolite Y. The process is efficient both from the standpoints of conversion rates and selectivity for the desired middle distillates.

Catalytic midbarrel hydrocracking is a petroleum refining process of rapidly increasing importance due to the similarly rapid increase in the demand for middle-distillate fuels. In general the process comprises converting heavy petroleum feedstocks boiling above about 700° F. to lower-boiling products in the range of about 300° F. to about 700° F., e.g. fuel gases, gasoline, petrochemical naphthas, furnace oil and diesel and turbine fuels. The catalysts employed are of the dual functional type and comprise a hydrogenation-dehydrogenation component, such as a Group VIII noble metal or a combination of Group VIII and Group VIB metal, in combination with a solid acid support, such as silica-alumina or an aluminosilicate, which is the acidic cracking component.

Of the solid acid components, it is generally considered that zeolitic aluminosilicates are the most active in the sense that they convert the highest fraction of feedstock to products under reasonable operating conditions. Activity, however, is only one of three essential properties of a midbarrel hydrocracking catalyst—the other two being selectivity, i.e. the tendency of the catalyst to produce desirable products exclusively, and stability which is a measure of the useful operating life of the catalyst. In the case of crystalline zeolitic catalyst bases as a class, it has been found that their high activity does not compensate for their relatively poor selectivity, and accordingly few if any present commercial midbarrel hydrocracking catalysts utilize zeolites as the principal acid cracking component. Instead, this function is provided by amorphous compositions such as silica-aluminas, which exhibit quite good selectivity but notably lower activity. Processes utilizing these amorphous catalysts necessarily, because of low stability, employ large amounts of catalyst, larger reactors and higher total pressures than are desirable from the standpoint of capital and manufacturing costs.

It is, accordingly, the principal object of the present invention to provide a midbarrel hydrocracking process which can utilize the high activity of crystalline zeolitic supports without sacrificing the selectivity of amorphous compositions and at the same time having excellent stability.

It has now been found that such a process is enabled by the use as the acid catalyst component of a particular derivative of zeolite Y which is extraordinarily hydrophobic, i.e. has a high adsorptive capacity for relatively non-polar organic molecules but a very low affinity for highly polar water molecules. The selectivity of this acid catalyst component is abnormally high for a crystalline material, whereas the activity and stability are not impaired in comparison with other known zeolite supports. Further, the relationship between the hydrogenation component and the acid support, which in general is quite complex and not fully understood, is highly compatible in the sense that interreactions between the two are either favorable or very slight. Also, the relationship between the two catalytic components is not appreciably altered by components of the feedstocks or the product.

The particular zeolite acid components of the catalyst of the present process are defined and the method for their preparation disclosed in detail in copending and commonly assigned U.S. application Ser. No. 880,561, filed Feb. 23, 1978, by David E. Earls and entitled "Ultrahydrophobic Zeolite Y", (UHP-Y) said application being incorporated by reference herein in its entirety. In general, UHP-Y zeolites can be characterized to distinguish them from all other zeolite forms as being zeolitic aluminosilicates having a $SiO_2/Al_2O_3$ molar ratio of from 4.5 to 35, preferably 4.5 to 9, the essential X-ray powder diffraction pattern of zeolite Y, an ion-exchange capacity of not greater than 0.070, a unit cell dimension $a_o$, of from 24.20 to 24.45 Angstroms, a surface area of at least 350 m²/g. (B-E-T), a sorptive capacity for water vapor at 25° C. and a $p/p_o$ value of 0.10 of less than 5.00 weight percent, and a Residual Butanol Test value of not more than 0.40 weight percent.

As used herein in this Specification and the appended claims, the following terms are intended to have the meanings set forth immediately below:

Surface areas of all zeolitic compositions are determined by the well-known Brunauer-Emmett-Teller method (B-E-T) (S. Brunauer, P. Emmett and E. Teller, J. Am. Chem. Soc. 60, 309 (1938)) using nitrogen as the adsorbate.

The essential X-ray powder diffraction pattern of zeolite Y is set forth in U.S. Pat. No. 3,130,007, issued Apr. 21, 1964 and is incorporated by reference herein in its entirety. It will be understood by those skilled in the art that the shrinkage of the unit cell resulting from the steaming process which produces UHP-Y will cause some slight shift in the d-spacings. In all events, the X-ray diffraction pattern of the UHP-Y compositions exhibit at least the d-spacings corresponding to the Miller Indices set forth in Table A infra, and can contain all the other d-spacings permissible to the face-centered cubic system with a unit cell edge of 24.20 to 24.45 Angstroms. The value of the d-spacings in Angstroms can be readily calculated by substitution in the formula:

$$d_{hkl} = \frac{a_o}{\sqrt{h^2 + k^2 + l^2}}$$

The X-ray pattern of the UHP-Y zeolites is obtained by standard X-ray powder techniques. The radiation source is a high intensity, copper target X-ray tube operated at 50 Kv and 40 ma. The diffraction pattern from the copper K radiation and graphite monochromator is suitably recorded by an X-ray spectrometer scintillation counter, pulse height analyzer and strip chart recorder. Flat compressed powder samples are scanned at 1° per minute, using a 2-second time constant. Interplanar spacings (d) are obtained from Bragg Angle (2 theta) positions of peaks after subtracting background. The crystal symmetry is cubic.

TABLE A

| Miller Indices hkl | Intensity $I/I_o$ |
|---|---|
| 111 | very strong |
| 220 | medium |

TABLE A-continued

| Miller Indices hkl | Intensity I/I$_o$ |
| --- | --- |
| 311 | medium |
| 331 | strong |
| 333; 511 | medium |
| 440 | medium |
| 533 | strong |
| 642 | strong |
| 751; 555 | strong |

The anhydrous state of any zeolite composition for purposes of determining constituent proportions in terms of weight percent is the condition of the zeolite after being fired in air at 1000° C. for one hour.

The term ion exchange capacity or IEC is intended to denote the number of active cation sites in the zeolite which exhibit a strong affinity for water molecules and hence appreciably affect the overall capacity of the zeolite to adsorb water vapor. These include all sites which are either occupied by any cation, but in any event are capable of becoming associated with sodium cations when the zeolite is contacted at 25° C. three times for a period of one hour each with a fresh aqueous ion exchange solution containing as the solute 0.2 mole of NaCl per liter of solution, in proportions such that 100 ml. of solution is used for each gram of zeolite. After this contact of the zeolite with the ion-exchange solution, routine chemical gravimetric analysis is performed to determine the relative molar proportions of Al$_2$O$_3$, SiO$_2$ and Na$_2$O. The data are then substituted in the formula:

$$IEC = k[Na_2O/SiO_2]$$

wherein "k" is the SiO$_2$/Al$_2$O$_3$ molar ratio of the zeolite immediately prior to contact with the NaCl ion-exchange solution.

The Residual Butanol Test is a measure of the adsorptive selectivity of zeolite adsorbents for relatively non-polar organic molecules under conditions in which there is active competition between water and less polar molecules for adsorption on the zeolite. The test procedure consists of activating the zeolite sample by heating in air at a temperature of 300° C. for 16 hours. Thereafter, the activated zeolite crystals are slurried with a solution of 1-butanol in water in proportions such that the slurry consists of 1.0 part by weight 1-butanol, 100 parts by weight water and 10 parts by weight of the as-activated zeolite. The slurry is mildly agitated for 16 hours while the temperature is maintained at 25° C. The supernatant liquid is then analyzed for its residual 1-butanol content in terms of weight percent.

For the determination of the sorptive capacity of the UHP-Y compositions for any particular adsorbate, for example, water, the test zeolite sample is activated by preheating at 425° C. for 16 hours at a pressure of 5 micrometers of mercury in a conventional McBain apparatus. Thereafter, the temperature of the sample is adjusted to the desired value and contacted with the vapor of the test adsorbate at the desired pressure.

In general, UHP-Y zeolites can be prepared from a type-Y zeolite starting material having a SiO$_2$/Al$_2$O$_3$ molar ratio of from 4.5 to 6.0, not greater than 3.3 equivalent percent metal cations and having an adsorptive capacity for water vapor at 25° C. and a p/p$^\circ$ value of 0.10 of at least 6.0 weight percent and a surface area of at least 350 m$^2$/g. The conversion to a UHP-Y type zeolite is accomplished by calcining the starting zeolite in an environment comprising from about 0.2 to 10 atmospheres of steam at a temperature of from 725° C. to 870° C. for a period of time sufficient to reduce the adsorption capacity for water vapor at 25° C. and p/p$^\circ$ value of 0.10 of less than 5.00 weight percent. It is advantageous to carry out the calcination in an environment of steam at about 1 atmosphere pressure and at a temperature of about 800° C. for a period of from about 0.5 to 4 hours.

The UHP-Y zeolite component should comprise at least 2 weight percent (anhydrous) of the overall catalyst composition, and preferably at least 5 weight percent. The UHP-Y constituent can be employed in combination with any of the solid acid catalysts components which are known to be useful in hydrocracking catalysts, but such combinations tend to be less effective than the use of UHP-Y as the sole acid support or in combination with relatively inert refractory diluents such as alumina, silica, magnesia, zirconia, beryllia, titania and mixtures thereof.

The hydrogenation component of the present catalyst composition include the Group VIII noble metals, particularly platinum and palladium, but when the feedstocks being hydrocracked contain more than as 1.0 weight percent sulfur are preferably a combination of Group VIII non-noble metals and Group VIB metals. These latter metals include molybdenum, tungsten, nickel and cobalt. The hydrogenation metal components are usually present in the final catalyst composition as oxides, or more preferably, as sulfides when such compounds are readily formed from the particular metal involved. Preferred overall catalyst compositions contain in excess of about 5 weight percent, preferably about 5 to about 40 weight percent molybdenum and/or tungsten, and at least about 0.5, and generally about 1 to about 15 weight percent of nickel and/or cobalt determined as the corresponding oxides. The sulfide form of these metals is most preferred due to higher activity, selectivity and activity retention.

The hydrogenation components can be incorporated into the overall catalyst composition by any one of numerous procedures. They can be added either to the zeolite or the metal oxide or a combination of both. In the alternative, the Group VIII components can be added to the zeolite by co-mulling, impregnation, or ion exchange and the Group VI components, i.e., molybdenum and tungsten, can be combined with the refractory oxide by impregnation, co-mulling or co-precipitation.

Although these components can be combined with the catalyst support as the sulfides, that is generally not the case. They are usually added as a metal salt which can be thermally converted to the corresponding oxide in an oxidizing atmosphere or reduced to the metal with hydrogen or other reducing agent. The composition can then be sulfided by reaction with a sulfur donor such as carbon bisulfide, hydrogen sulfide, hydrocarbon thiols, elemental sulfur, and the like.

When refractory metal oxides such as alumina are to be present in the catalyst, any of the numerous well known techniques can be used to combine same with the UHP-Y component. For example the zeolite can be mulled with a hydrogel of the oxide followed by partial drying if required and extruding, pelletizing or the like to form particles of the desired shape. Alternatively, the refractory oxide can be precipitated in the presence of the zeolite. This is accomplished by increasing the pH of a solution of a refractory oxide precursor such as sodium aluminate, sodium silicate and the like. As described above, the combination can then be partially dried as desired, tableted, pelleted, extruded, or formed by other means and then calcined, e.g., at a temperature above 600°, usually above 800° F.

Hydrogenation components can be incorporated at any one of a number of stages in the catalyst preparation. For example, metal compounds such as the sulfides, oxides or water-soluble salts such as ammonium heptamolybdate, ammonium tungstate, nickel nitrate, cobalt sulfate and the like can be added by co-mulling, impregnation or precipitation to either the zeolite or the refractory oxide or the combination of both before the composite is finally calcined. In the aternative these components can be added to the finished particle by impregnation with an aqueous, alcoholic or hydrocarbon solution of soluble compounds or precursors. Impregnation is the preferred technique.

The hydrocarbon feedstocks suitably treated in the present process boil primarily above about 700° F. At least about 90 percent of the feed will generally boil between about 700° and about 1,200° F. Feedstocks having these characteristics include gal oils, vacuum gas oils, deasphalted residua, catalytic cracking cycle stocks, shale oil, tar sand oil, coal tars and liquids and the like. The feed to the hydrocracking zone generally contains at least about 5 ppm and usually between about 10 ppm and 0.1 weight percent nitrogen as organonitrogen compounds. It may also contain substantial amounts of mono- or polynuclear aromatic compounds corresponding to at least about 5 and generally about 5 to about 40 volume percent aromatics.

Reaction temperatures exceed about 500° F., and are usually above about 600° F., preferably between 600° and 900° F. Hydrogen addition rates should be at least about 400, and are usually between about 2,000 and about 15,000 standard cubic fee per barrel. Reaction pressure exceed 200 psig and are usually within the range of about 500 to about 3,000 psig. Contact times usually correspond to liquid hourly space velocities in fixed bed catalytic systems less than about 15, preferably between about 0.2 and about 10.

Overall conversion rate is primarily controlled by reaction temperature and liquid hourly space velocity. However, selectivity to mid-barrel distillate products is generally inversely proportional to reaction temperature. It is not as severely affected by reduced space velocities at otherwise constant conversion. Conversely, selectivity is usually improved at higher pressures and hydrogen addition rates. Thus the most desirable conditions for the conversion of a specific feed to a predetermined product can be best obtained by converting the feed at several different temperatures, pressure, space velocities and hydrogen addition rates, correlating the effect of each of these variables and selecting the best compromise of overall conversion and selectivity.

The method for manufacture of UHP-Y zeolite and the overall catalyst composition, the practice of the present process using such catalyst composition and a comparison of results obtained in midbarrel hydrocracking versus a prior known and similar catalyst are illustrated in the following examples. In the reported results the catalyst activity is defined as the average reactor temperature needed to achieve the desired extent of conversion of fresh feed to products boiling below 700° F., while selectivity is defined as the volume fraction of product boiling below 700° F. that boils within the range 300°–700° F. In all cases, boiling point distribution of products were estimated by a gas chromatographic procedure based on ASTM standard D-2887-70T.

EXAMPLE 1

(Preparation of UHP-Y)

A sample of air-dried ammonium exchanged type Y zeolite having a composition exclusive of water of hydration:

0.156 Na$_2$O: 0.849 (NH$_4$)$_2$O: Al$_2$O$_3$: 5.13 SiO$_2$ was tableted into ⅛ inch diameter slugs and charged to a Vycor tube 24 inches in length and 2.5 inches in diameter and provided with an external heating means. Over a period of 0.25 hours, the temperature of the charge was raised to 600° C. and thereafter maintained at this temperature for one hour. During this 1.25 hour period, a pure steam atmosphere at 14.7 psia generated from demineralized water was passed upward through the charge in the tube at a rate of 0.1 to 0.5 pounds per hour. Ammonia gas generated during the heating by deamination of the zeolite was passed from the system continually. At the termination of the heating period the steam flow through the tube was stopped and the temperature of the charge in the tube was lowered to ambient room temperature over a period of 5 minutes. Analysis of this steamed product indicated the characteristic X-ray powder diffraction pattern of zeolite Y, a surface area of 760 m$^2$/g and an a· value of 24.52 Angstroms. Thereafter the sodium cation content of the first steamed material was reduced to 2.0 equivalent percent (0.27 weight percent as Na$_2$O) by ion exchange using an aqueous solution of NH$_4$Cl (30 wt.-%) at reflux. This product was thereafter converted to UHP-Y using the same apparatus and conditions except that the pure steam calcination atmosphere was passed over the sample in the reactor at 14.7 psia at a temperature of 800° C. for 4 hours. The product was then cooled to ambient room temperature in a desiccator and portions thereof analyzed for ion-exchange capacity, B-E-T nitrogen surface area, adsorption capacity for water, nitrogen and n-hexane and Residual Butanol Test value. The data from the analyses are set forth below:

| Adsorbate | Adsorptive Capacity: | | |
|---|---|---|---|
| | Pressure mm Hg. | Temp., °C. | Loading wt. - % |
| Nitrogen | 35 | −196 | 15.8 |
| Nitrogen | 66 | −196 | 16.5 |
| Nitrogen | 137 | −196 | 17.3 |
| Nitrogen | 528 | −196 | 19.2 |
| Water | 2.0 | 25 | 3.1 |
| Water | 4.6 | 25 | 4.6 |
| Water | 20.0 | 25 | 15.0 |
| n-Hexane | 5.0 | 25 | 10.8 |
| n-Hexane | 20.0 | 25 | 14.2 |
| n-Hexane | 50.0 | 25 | 16.0 |
| n-Hexane | 75.0 | 25 | 19.8 |
| Ion-Exchange Capacity: | = | 0.04 | |
| Surface Area | = | 530 m$^2$/g | |
| Residual Butanol Test Value | = | 0.23 weight percent | |

EXAMPLE 2

A midbarrel hydrocracking catalyst composition was prepared as follows: 375 grams (anhydrous weight) of UHP-Y having a unit cell dimension of 24.30 A, a surface of 540 m²/g, a water adsorption capacity of 4.8 weight percent at 25° C. and 4.6 Torr water vapor pressure, and a Residual Butanol Test Value of 0.30 weight percent, was ammonium cation exchanged by means of a 1-hour reflux with 3.8 liters of 10% NH₄Cl solution (aqueous), after which the zeolite was washed chloride-free. The chemical composition was:

$Na_2O$—0.09 wt.-% (anhyd.)
$(NH_4)_2O$—0.5 wt.-% (anhyd.)
$SiO_2$—77.2 wt.-% (anhyd.)
$Al_2O_3$—21.5 wt.-% (anhyd.)

The ammonium-exchanged UHP-Y thoroughly admixed with 238 grams of $NiCO_3$, 521 grams of ammonium heptamolybdate tetrahydrate and 1050 grams (anhydrous) of medium density substrate alumina. A 500 gram portion of alumina prepared by the hydrolysis of an aluminum alcoholate was peptized with a solution of 70 ml. conc. $HNO_3$ in 2000 ml. $H_2O$, and then blended into the aforesaid mixture of other catalyst components. The resulting blend was extruded through a 1/16" circular die, dried overnight at 110° C., heated at 220° C. for 2 hours and then further heated at 500° C. for 2 hours in a forced air oven. The composition of the final calcined catalyst product was 15 weight-% UHP-Y zeolite, 6 weight-% NiO, 17 weight-% $MoO_3$ and 62 weight-% $Al_2O_3$.

EXAMPLE 3

The catalyst composition prepared in Example 2 supra was tested for hydrocracking capabilities using two different feedstocks having the following properties:

| Feedstock | Kuwait Vacuum Gas Oil | Arabian Vacuum Gas Oil |
|---|---|---|
| Specific gravity | 23.6° API | 22.4° API |
| Sulfur | 2.74 wt. % | 2.40 wt. % |
| Nitrogen (total) | 0.075 wt. % | 0.073 wt. % |
| IPB (ASTM D-1160) | 649° F. | 691° F. |
| EP (ASTM D-1160) | 1002° F. | 1053° F. |

The test apparatus was a fixed bed bench-scale reactor containing 150 ml. of catalyst diluted with 150 ml. quartz −12/+16 mesh chips. In the reactor the catalyst charge was activated by purging with a 10% $H_2S$/90% $H_2$ gas stream at atmospheric pressure while the temperature was slowly raised from ambient to 700° F. to effect sulfiding of the hydrogenation component. The hydrocracking conditions were:

| Reactor configuration | Downflow |
|---|---|
| Pressure | 1800 psig (Kuwait feedstock) |
|  | 2000 psig (Arabian feedstock) |
| H₂ flowrate | 10000 SCF/barrel |
| LHSV | 1.0 hr.⁻¹ (based on catalyst) |

In the test involving the Kuwait feedstock the catalyst activity was 751° F. to achieve a 70 volume percent conversion and the selectivity was 87 volume percent. With the Arabian feedstock the corresponding values were 758° F. to achieve 60 vol-% conversion and 80 volume percent selectivity.

EXAMPLE 4

(a) A UHP-Y zeolite sample was prepared by steaming an ammonium exchanged precursor substantially the same as described in Example 1 supra in a rotary kiln at a shell temperature of 860° C. and a total residence time of 180 minutes. The steaming environment over the zeolite was essentially pure steam at one atmosphere. The product zeolite had a unit cell dimension of 24.27 Å, a surface area of 579 m²/g, an adsorptive capacity for water at 25° C. and 4.6 Torr water vapor pressure of 3.7 wt.-% and a Residual Butanol Test Value of 0.4 wt.-%. The ion exchange capacity was below 0.05. The sodium content in terms of weight percent $Na_2O$ was below 0.25 wt.-%. The zeolite product was incorporated into a mid-barrel hydrocracking catalyst composition using the same procedure as set forth in Example 2 above, and tested for hydrocracking activity and selectivity using the same feedstock and test procedure as set forth in Example 3. With the Arabian feedstock, the catalyst activity was 764° F. to achieve a 60 vol.-% conversion and the selectivity was 86 volume percent.

(b) Using the same precursor zeolite and the same rotary kiln apparatus as in part (a) of this example, a zeolite composition was prepared by the same procedure except that the residence time in the kiln was 90 minutes instead of 180 minutes. This product zeolite has physical properties very similar to those of UHP-Y but failed to exhibit the very high degree of hydrophobicity required to qualify as UHP-Y. The water adsorption capacity of this composition was 8.5 weight percent at 25° C. and 4.6 Torr water vapor pressure. This zeolite was substituted for the UHP-Y zeolite component of the catalyst composition in part (a) of this example and tested for hydrocracking activity and selectivity using the same procedure with the Kuwait feedstock. It was found that although the activity was essentially the same as the catalyst of part (a), i.e. 747° F. to achieve a 70 volume percent conversion, the selectivity decreased drastically to 74 volume percent.

(c) A commercial hydrocracking catalyst was tested for mid-barrel hydrocracking in which the cracking component is an ammonium exchanged zeolite Y having a $Na_2O$ content of 2.5 weight-% and a $SiO_2/Al_2O_3$ molar ratio of 5 which had been steamed at 600° C. for about 60 minutes and then ammonium exchanged to lower the $Na_2O$ content to about 0.2 weight-%. The water adsorption capacity of this zeolite at 25° C. and a water vapor pressure of 4.6 Torr was 27 wt.-%. The overall catalyst had the composition of:

Zeolite—14 wt.-%
NiO—6 wt.-%
$P_2O_5$—6 wt.-%
$MoO_3$—17 wt.-%
$Al_2O_3$—57 wt.-%

Using the Kuwait feedstock, the activity of the catalyst was 745° F. to achieve a 70% conversion and a selectivity of 65 wt-%.

EXAMPLE 5

A number of catalyst compositions of the present invention were prepared according to the general procedure of Example 2 using various proportions of zeolite, diluent and hydrogenation components. The $P_2O_5$ in certain of the compositions results from the addition of phosphoric acid into the composition during preparation to stabilize the solutions containing ammonium paramolybdate, the precursor of $MoO_3$. Nickel is added to the compositions as nickel nitrate and tungsten as ammonium paratungstate. The various catalyst compositions had the following proportions of constituents;

(a)

UHP-Y—7.5 wt.-%
Acid-washed bentonite clay—14.0 wt.-%
NiO—6.0 wt.-%
MoO$_3$—17.0 wt.-%
Al$_2$O$_3$—Balance (b)

UHP-Y—7 wt.-%
NiO—6 wt.-%
P$_2$O$_5$—6 wt.-%
MoO$_3$—17 wt.-%
Al$_2$O$_3$—Balance (c)

UHP-Y—4 wt.-%
NiO—6 wt.-%
P$_2$O$_5$—6 wt.-%
MoO$_3$n—18 wt.-%
Al$_2$O$_3$—Balance (d)

UHP-Y—8 wt.-%
NiO—6 wt.-%
MoO$_3$—17 wt.-%
Al$_2$O$_3$—Balance

The foregoing catalysts were all tested for catalytic activity and selectivity in mid-barrel hydrocracking using the procedure and apparatus described hereinbefore in Example 3 and using a feedstock having the following properties:

specific Gravity—22.4 API
Sulfur—2.40 wt.-%
Nitrogen (total)—0.07 wt.-%
IPB (ASTM D-1160)—691° F.
EP (ASTM-D-1160)—1053° F.

The results are set forth in Table B below along with a summary of the results obtained in testing the composition of other Examples.

TABLE B

| Catalyst Composition | Activity Temperature °F. | Selectivity Vol. - % Diesel |
|---|---|---|
| Example 2* | 758 | 80 |
| Example 2* | 751** | 87** |
| Example 4(a) | 764 | 86 |
| Example 4(b) | 747** | 74 |
| Example 4(c) | 745** | 65** |
| Example 5(a) | 765 | 86 |
| Example 5(b) | 761 | 87 |
| Example 5(c) | 782 | 89 |
| Example 5(d) | 779 | 88 |

*The ammonium-exchanged form of UHP-Y
**The Kuwait VGO feedstock of Example 3.

What is claimed is:

1. In the method for selectively converting hydrocarbons boiling above about 700° F. to midbarrel fuel products boiling between about 300° and 700° F. which comprises reacting said hydrocarbons with hydrogen under hydrocracking conditions in the presence of a catalyst composition comprising a hydrogenation component and a crystalline aluminosilicate cracking component, the improvement which comprises utilizing as a cracking component a zeolite aluminosilicate having a SiO$_2$/Al$_2$O$_3$ molar ratio of from 4.5 to 35, the essential X-ray powder diffraction pattern of zeolite Y, an ion exchange capacity of not greater than 0.070, a unit cell dimension a$^\circ$ of from 24.20 to 24.45 A, a surface area of at least 350 m$^2$/g (B-E-T), a sorptive capacity for water vapor at 25° C. and a p/p$^\circ$ value of 0.10 of less than 5.00 weight percent and a Residual Butanol Test value of not more than 0.40 weight percent.

2. Process according to claim 1 wherein the SiO$_2$/Al$_2$O$_3$ molar ratio of the zeolite aluminosilicate is from 4.5 to 9.

* * * * *

UNITED STATES PATENT AND TRADEMARK OFFICE
CERTIFICATE OF CORRECTION

PATENT NO. : 4,401,556
DATED : August 30, 1983
INVENTOR(S) : Richard D. Bezman, et al It is certified that error appears in the above—identified patent and that said Letters Patent is hereby corrected as shown below:

Column 1, line 41, after the word "selectivity" insert therefor -- midbarrel boiling range products, --

Signed and Sealed this

Fourteenth Day of August 1984

[SEAL]

Attest:

GERALD J. MOSSINGHOFF

Attesting Officer

Commissioner of Patents and Trademarks